United States Patent

Wheeler et al.

[15] 3,706,251
[45] Dec. 19, 1972

[54] SHEARING APPARATUS

[72] Inventors: Donald J. Wheeler, Kent; Victor Lohrenz, Bedford, both of Ohio

[73] Assignee: said Wheeler, by said Lohrenz

[22] Filed: April 17, 1970

[21] Appl. No.: 29,430

[52] U.S. Cl. ..................83/456, 83/10, 83/451, 83/487, 83/508, 83/614, 83/622, 83/636, 83/640, 83/646

[51] Int. Cl. ..........................B26d 7/02, B26d 1/20

[58] Field of Search............83/9, 11, 49, 52, 56, 469, 83/471, 477, 483–489, 213, 596, 614, 640, 699, 451, 10, 456, 508, 622, 636, 646

[56] References Cited

UNITED STATES PATENTS

| | | | |
|---|---|---|---|
| 3,277,760 | 10/1966 | Keene et al. | 83/614 X |
| 2,542,465 | 2/1951 | Blanchard | 83/614 X |
| 1,856,128 | 5/1932 | Drake | 83/614 X |

FOREIGN PATENTS OR APPLICATIONS

| | | | |
|---|---|---|---|
| 437,291 | 11/1926 | Germany | 83/487 |
| 2,005,638 | 12/1969 | France | 83/213 |
| 954,948 | 6/1949 | France | 83/614 |
| 515,094 | 11/1939 | Great Britain | 83/614 |
| 871,396 | 7/1949 | Germany | 83/11 |
| 424,107 | 2/1935 | Great Britain | 83/614 |
| 990,359 | 7/1949 | France | 83/614 |

Primary Examiner—Andrew R. Juhasz
Assistant Examiner—James S. Coan
Attorney—Oberlin, Maky, Donnelly and Renner

[57] ABSTRACT

Shearing apparatus includes a tranversely movable shear assembly having a plurality of shear blades mounted thereon which shear strip material during traversal thereof with very little or no bending of the strip material. The relative vertical positions and depth of cut of the shear blades may be controlled to vary the amount of force and number of passes required to shear the strip material. Where plural passes are required, the transversely movable shear assembly is progressively advanced toward the strip material during each pass to progressively shear the material.

13 Claims, 14 Drawing Figures

PATENTED DEC 19 1972
3,706,251
SHEET 1 OF 3
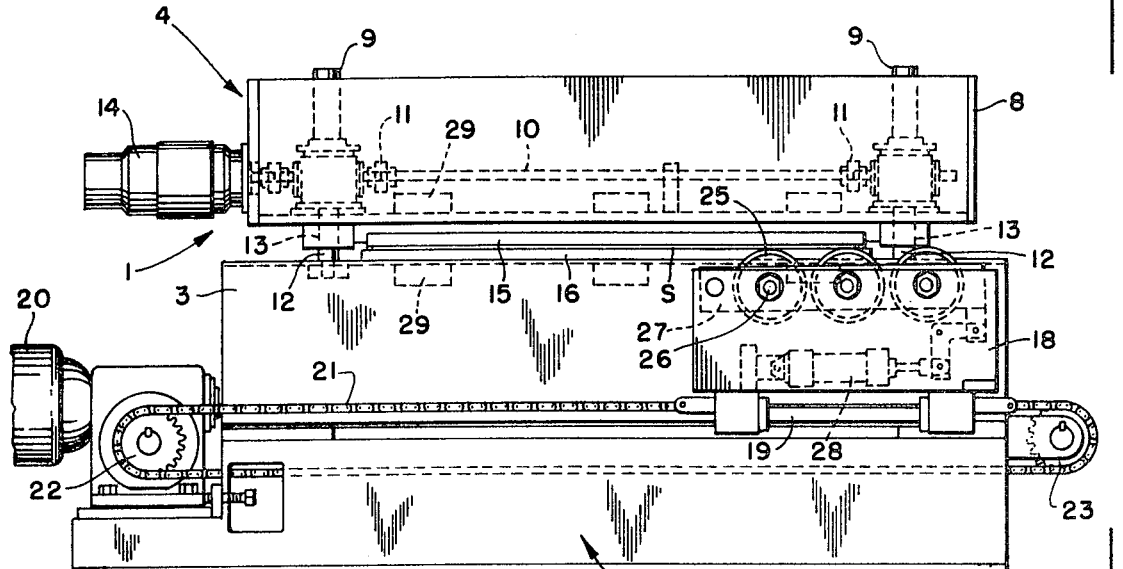
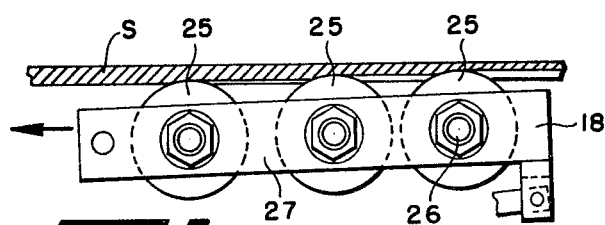
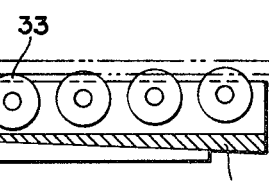
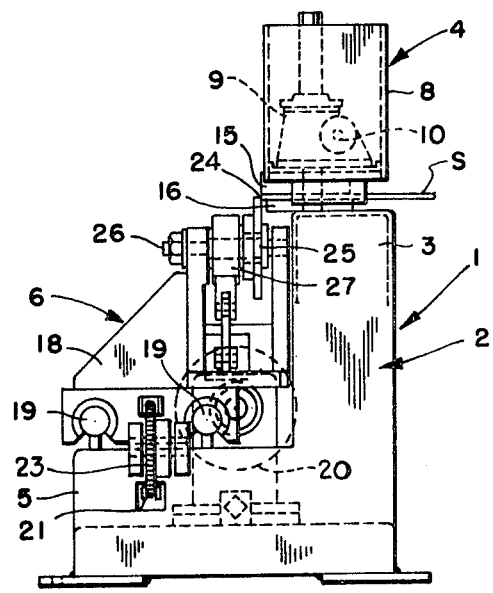
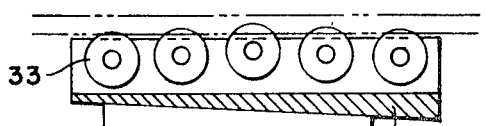
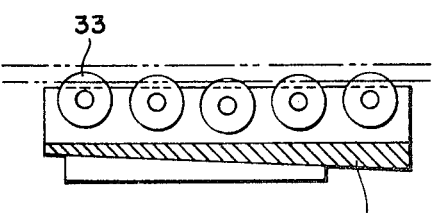
INVENTORS
DONALD J. WHEELER
VICTOR LOHRENZ
BY Oberlin, Maky, Donnelly & Renner
ATTORNEYS

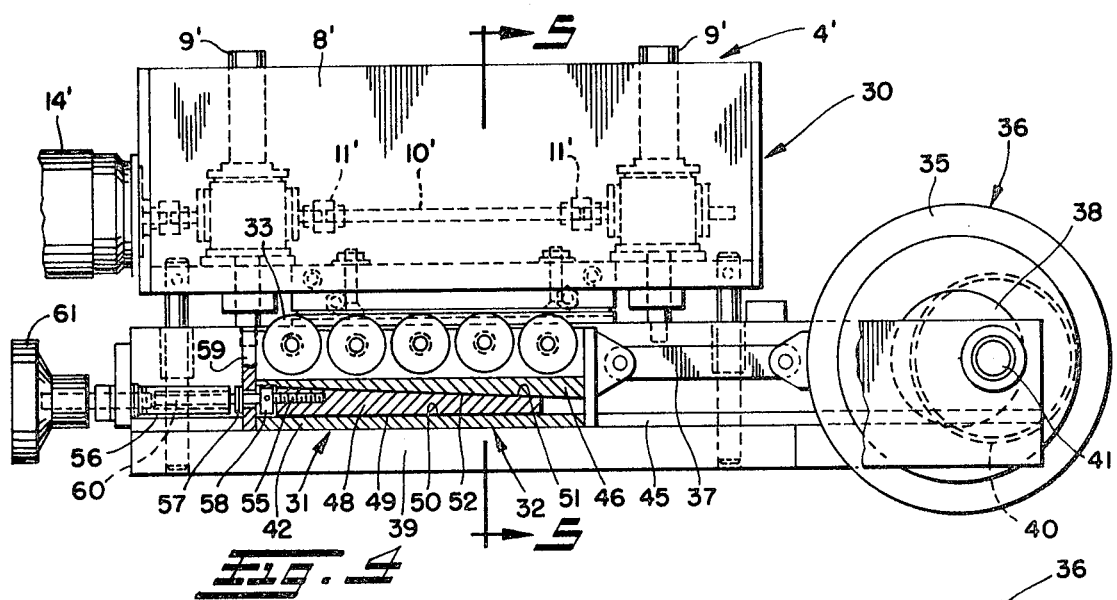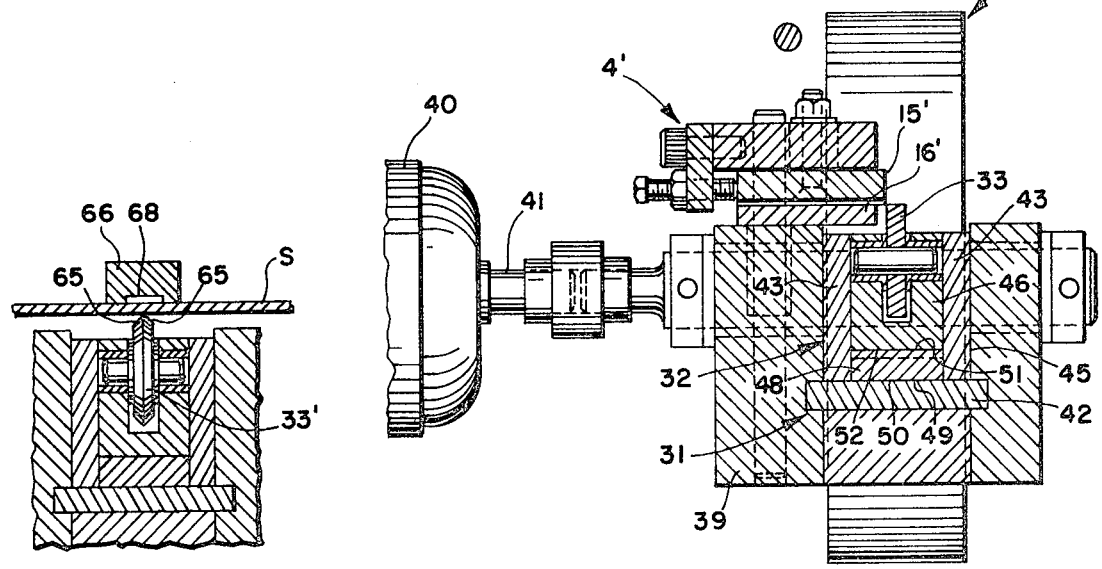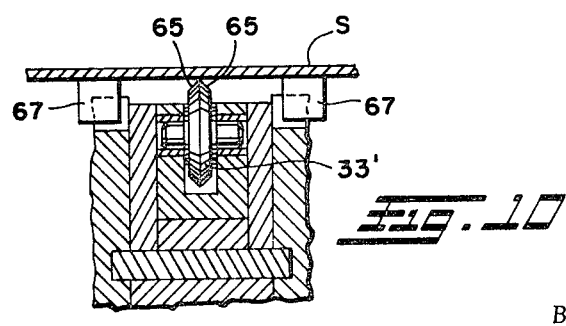

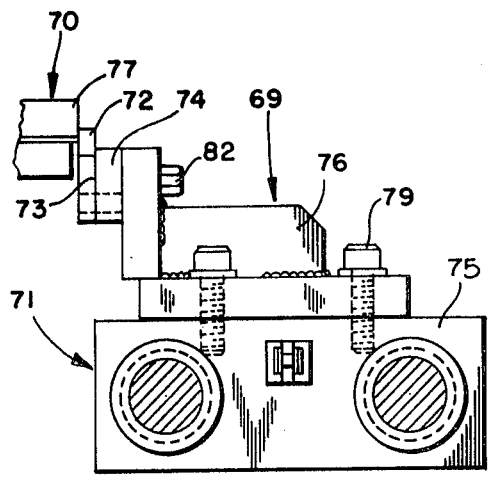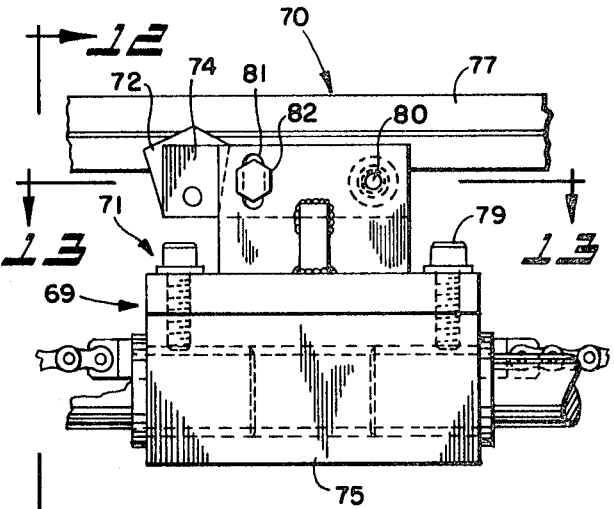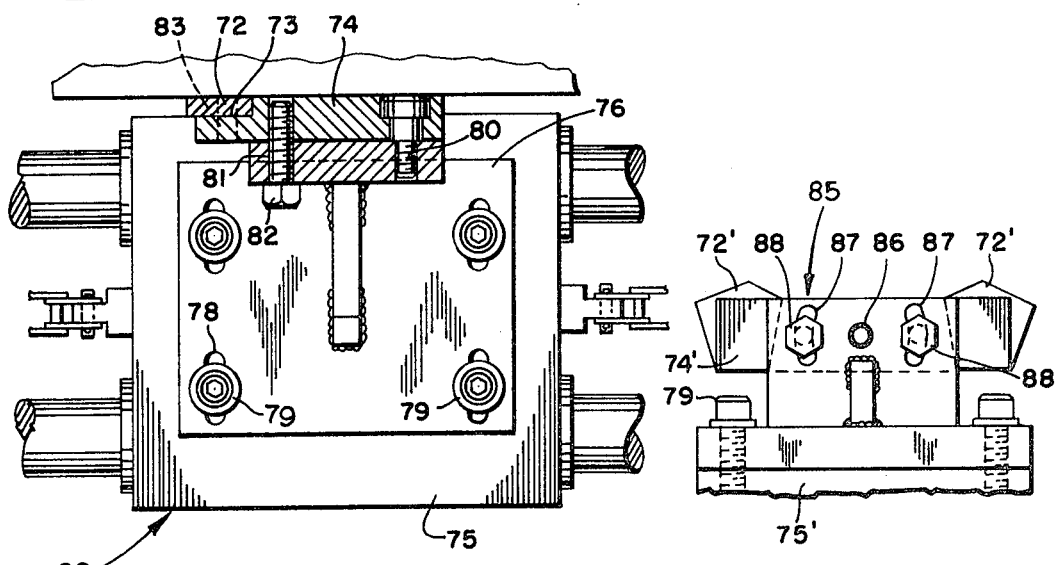

SHEARING APPARATUS

BACKGROUND OF THE INVENTION

This invention generally relates to shearing apparatus of relatively light-weight and low cost construction for use in precise shearing of strips, sheets and plates of metal or other material such as plastic with very little or no distortion or bending of the material during shearing.

In recent years considerable advancements have been made in reducing the cost and size of strip shearing apparatus by utilizing circular shear blades mounted on carriages for shearing the strip material during traversal of the strip by the carriage. As an example of such a shearing apparatus which has met with considerable success particularly for use in strip processing lines to shear the ends from strips and plates prior to joining, reference may be had to U.S. Pat. No. 3,476,000 granted Nov. 4, 1969. However, where more precise shearing is required, up to now it has still been the usual practice to use conventional crop shears despite their relatively high cost and larger size, since the transversely movable circular shear blades have a tendency to bend the material slightly during shearing, which may result in objectionable curling of the sheared edge for certain applications.

SUMMARY OF THE INVENTION

With the foregoing in mind, it is a principal object of this invention to provide a shearing apparatus which also utilizes a transversely movable shear assembly for reducing the cost and size of the apparatus but without causing any objectionable bending or distortion of the material during shearing.

Another object is to provide such a shearing apparatus which requires less force than previously required to shear the strip material.

These and other objects of the present invention may be achieved by providing the shearing apparatus with a transversely movable shear assembly on which are mounted a plurality of shear blades arranged to substantially reduce or completely eliminate the rake angle of the shear blades with respect to the strip material and thereby avoid any tendency of the shear blades to bend the strip material during shearing. In one form of the invention, the shear blades are mounted on a pivotal support to permit adjustment of the rake angle of the shear blades to suit the material being sheared, and the depth of penetration of the shear blades may be controlled for shearing the strip material in a single path of the strip material or plural passes. Where plural passes are required, suitable means are also provided for progressively advancing the shear blades toward the strip material during each pass. With the latter construction, the upper cutting edges of the shear blades may be arranged in the same general horizontal plane to completely eliminate the rake angle so that the strip will remain perfectly flat during the shearing operation.

Where the strip material is sheared in increments, less force is required to move the shear assembly back and forth than is required when the shearing is done in a single pass. The amount of force actually required to reciprocate the shear assembly may be varied by varying the rate of advancement of the shear assembly toward the strip material and by staggering the shear blades so that they successively engage the strip material during such advancement.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principles of the invention may be employed.

BRIEF DESCRIPTION OF THE DRAWINGS

In the annexed drawings:

FIG. 1 is a side elevation view of one form of shearing apparatus constructed in accordance with the subject invention;

FIG. 2 is an end elevation view of the shearing apparatus of FIG. 1 as seen from the plane of the line 2—2 at the right end of FIG. 1;

FIG. 3 is an enlarged schematic illustration showing the manner in which the strip material is sheared during a single pass using the shearing apparatus of FIGS. 1 and 2;

FIG. 4 is a fragmentary side elevation view of another form of shearing apparatus in accordance with this invention, having portions of the transversely movable shear assembly broken away to show the mechanism by which the shear blades are advanced into the strip during reciprocation thereof;

FIG. 5 is a vertical transverse section through the shearing apparatus of FIG. 4, taken on the plane of the line 5—5;

FIGS. 6 through 8 are schematic illustrations showing alternative arrangements for staggering the shear blades on the shear carriage of FIGS. 4 and 5 embodiment;

FIGS. 9 and 10 are schematic fragmentary sections through still other shearing apparatus embodiments constructed in accordance with this invention;

FIG. 11 is a fragmentary side elevation view of yet another form of shearing apparatus in accordance with this invention;

FIG. 12 is a fragmentary end elevation view of the apparatus of FIG. 11 as seen from the plane of the line 12—12 at the left end of the apparatus of FIG. 11;

FIG. 13 is a traverse section through the apparatus of FIG. 11, taken on the plane of the line 13—13 thereof; and FIG. 14 is a schematic fragmentary side elevation view of still another form of shearing apparatus in accordance with this invention.

DESCRIPTION OF THE PREFERRED EMBODIMENTS

In FIGS. 1 and 2 there is shown one form of strip shearing apparatus generally identified by the reference numeral 1, including a main frame or housing 2 having a vertical portion 3 on which is mounted an upper shear assembly 4 above strip pass height and a horizontal portion 5 on which is mounted a lower shear assembly 6 below strip pass height.

The upper shear assembly 4 may be of a construction substantially identical to the upper shear assembly which is the subject of the invention disclosed in the application of Donald J. Wheeler and William Adie, U.S. Ser. No. 29,488, entitled "Shearing Apparatus", filed Apr. 17, 1970, and now Patent No. 3,662,639 and the details thereof do not constitute any part of the present invention. As shown, such upper shear assembly 4 may comprise an elongated frame member 8 which supports a pair of laterally spaced apart jacks 9 connected together as by means of a drive rod 10 and couplings 11 for simultaneous actuation by a single drive motor 14. The rods 12 for the jacks 9 extend through openings 13 in the frame member 8 and are rigidly attached to the vertical portion 3 of the stationary main housing 2, whereby actuation of the jacks 9 will cause the upper shear assembly 4 to be raised and lowered relative to the main housing. A rectangular shear knife or blade 15 carried by the bottom of the frame member 8 presses downwardly against a backup bar 16 on the vertical frame member 3 during lowering of the upper shear assembly 4 to clamp a strip material S therebetween prior to shearing of the strip material, in a manner to be more fully described hereafter.

The lower shear assembly 6 is also of a construction generally similar to the lower shear assembly of the aforementioned copending application of Donald J. Wheeler and William Adie, and includes a carriage 18 mounted on guide rails 19 or the like for transverse movement across the strip material to be sheared. Suitable drive means such as a reversible drive motor 20 may be mounted at one end of the stationary housing 2 for connection to the carriage 18 as by means of a drive chain 21 engaging a drive sprocket 22 on the drive motor 20 and an idler sprocket 23 at the other end of the main housing. As apparent, actuation of the drive motor 20 in opposite directions causes the carriage 18 to move back and forth along the guide rails.

However, instead of providing a single circular shear blade on the carriage 18 for cooperation with the upper rectangular shear blade 15 to shear the strip material during traversal by the carriage as in such aforementioned application, series of circular shear blades 25 are provided on the carriage 18, each rotatably mounted on horizontally spaced support shafts 26 with their cutting edges 24 lying in the same vertical transverse plane for cooperation with the rectangular shear blade 15 of the upper shear assembly 4. Although the number of circular shear blades 25 may be varied, there are desirably at least three such circular shear blades, and the extent of projection of the uppermost cutting edge of each circular shear blade progressively increases from left to right as seen in FIGS. 1 through 3 to provide for progressive shearing of the strip material during traversal by the carriage. Thus, for example, as best seen in FIG. 3, the circular shear blade 25 at the left end of the carriage 18 penetrates the strip material only slightly; the next shear blade penetrates the strip material to a greater extent; and so on, with the furthest projecting shear blade at the right end of the carriage penetrating the strip material to a sufficient depth to cause the strip material to shear or break completely through during a single pass. The depth of penetration required to obtain shearing may vary anywhere from 30 to 50 percent of the thickness of the strip material or more depending upon the type of thickness of material being sheared. Because plural circular shear blades 25 are used to progressively shear the strip material, the rake angle defined by the cutting edges thereof is considerably less than if a single circular shear blade were used, with the result that there is very little bending of the strip material during shearing, and less force is required to move the carriage 18 to shear the strip material.

Preferably, the circular shear blades 25 are all of the same general size and are carried by a pivotal support 27 which may be raised and lowered as by actuation of a jack 28 connected thereto for varying the rake angle of the shear blades to accommodate different types and thicknesses of material. Alternatively, the support 27 for the circular shear blades 25 may be fixed relative to the carriage 18, and their respective support shafts 26 may be vertically staggered to obtain the desired progressive shearing by the circular shear blades, or progressively larger diameter shear blades may be used for accomplishing the same purpose. Electromagnets 29 may also be provided in the housing 8 or adjacent stationary support member 3 or both to resist bowing of the upper shear blade 15 during shearing of relatively thick and wide strip material, as disclosed and claimed in the aforementioned Wheeler and Adie application.

One disadvantage of the shearing apparatus of the FIGS. 1 through 3 embodiment is that it will only progressively shear the strip material during movement of the carriage from right to left as seen in FIGS. 1 and 3 due to the disposition of the circular shear blades. However, the furthest projecting circular shear blade 25 adjacent the right end of the carriage 18 may still be used by itself to shear the strip material during movement of the carriage from left to right with some bending and distortion of the strip material. Moreover, it will be apparent that additional circular shear blades 25 may be provided on the carriage 18 to the right of the furthest projecting shear blade as shown in FIG. 7 and properly positioned for progressively shearing the strip material during movement of the carriage in either direction.

In FIGS. 4 and 5 there is shown a modified form of shearing apparatus 30 including an upper shear assembly 4' generally similar to the upper shear assembly 4 of the FIGS. 1 through 3 embodiment, and accordingly the same reference numerals followed by a prime symbol are used to designate like parts. Such shearing apparatus 30 also comprises a lower shear assembly 31 including a transversely movable carriage 32 having a series of circular shear blades 33 mounted thereon for cooperation with the rectangular shear blade 15' of the upper shear assembly 4' for shearing the strip material during traversal of the strip material by the carriage. However, the details of construction and operation of the lower shear assembly 31 of the FIGS. 4 and 5 embodiment are somewhat different from that of the FIGS. 1 through 3 embodiment. First of all, the stroke of the movable carriage 32 of FIGS. 4 and 5 is substantially less, desirably being only slightly greater than the maximum spacing between adjacent shear blades, and the number of circular shear blades is increased so that the strip material is engaged by the circular shear blades across the entire width thereof during such limited movement. Moreover, the carriage 32 is desirably reciprocated back and forth at a relatively high rate during shearing, as for example, 200 strokes per minute, and the circular shear blades 33 are progressively advanced into the work during reciprocation of the carriage for progressively shearing the strip material.

Reciprocation of the carriage 32 may be achieved by connecting one end of the carriage 32 to the outer race 35 of a bearing 36 through a suitable linkage connection 37. The bearing 36 is supported on an eccentrically mounted hub 38 at one end of the stationary frame member 39. Rotation of the hub 38 as by operation of a drive motor 40 coupled to the hub shaft 41 will cause the carriage 32 to be reciprocated back and forth. Wear plates 42 and 43 attached to the bottom and sides of the carriage 32 provide reduced friction and wear during sliding movement of the carriage along a transversely extending guideway 45 on the stationary frame member 39.

During reciprocation of the movable carriage 32, progressive movement of the circular shear blades 33 toward the strip material will occur due to the mounting of the circular shear blades 33 on a support member 46 vertically slidably received between the vertical wear plates 43 on the carriage 32. Interposed between the bottom wear plate 42 of the carriage 32 and support member 46 there is a wedge block 48 having a flat bottom surface 49 slidably engaging the upper flat surface 50 of the bottom wear plate 42 and a tapered upper surface 51 in mating engagement with a correspondingly tapered surface 52 on the bottom of the support member 46. A screw shaft 55 having one end in threaded engagement with the wedge block 48 and the other end extending outwardly from one end of the carriage 32 is received in a tubular member 56 rotatably supported by the stationary frame member 39. The screw shaft 55 is retained against axial movement relative to the carriage 32 by a pair of collars 57 and 58 attached to the screw shaft 55 on opposite sides of the carriage end plate 59, and the projecting end portion 60 of the screw shaft 55 is desirably of rectangular section for sliding receipt in a correspondingly shaped opening in tubular member 56. Turning of the tubular member 56 as by rotation of a hand wheel 61 attached to the outer end thereof will cause simultaneous turning of the screw shaft 55 which moves the wedge block 48 axially relative to the support member 46, forcing the support member 46 and circular shear blades 33 carried thereby vertically inwardly or outwardly along the vertical wear plates 43.

Because the circular shear blades 33 are slowly advanced into the strip material during reciprocation of the carriage 32, all of the circular shear blades 33 may be made to project to the same extent beyond the upper edge of the support member 46 to establish a zero rake angle of the cutting edges with the strip material, with the result that the strip material will remain perfectly flat and be sheared at a uniform rate across the entire width thereof during the shearing operation. However, it will be apparent that the circular shear blades 33 may be staggered is desired for shearing the strip material at different rates to reduce the force required to reciprocate the carriage back and forth. Thus, for example, in FIG. 6 the circular shear blades 33 are shown projecting progressively further from left to right; in FIG. 7 the circular shear blades are shown progressively projecting further from both ends to the center; and in FIG. 8 the circular shear blades are shown progressively projecting further from the center out toward both ends. As apparent, any of these arrangements of the shear blades may be achieved by using the same size shear blades and staggering the mounting shafts therefor, or by using different size shear blades, as desired. The details of construction and operation of the shearing apparatus of FIGS. 6, 7 and 8 may otherwise be the same as that shown and described in FIGS. 4 and 5 embodiment, and accordingly no further discussion is believed necessary.

Although use of the upper shear assembly 4' is preferred in conjunction with the lower shear assembly 31 to shear the strip material during traversal of the strip by the lower shear assembly, it will be apparent that the upper shear assembly 4' could be eliminated if the sides 65 of the circular shear blades 33' were beveled and suitable means such as the backup bar 66 of FIG. 9 embodiment and electromagnets 67 of the FIG. 10 embodiment were used for retaining the strip material against vertical displacement during shearing by the circular shear blades. When a backup bar 66 is used it should desirably be relieved at 68 directly opposite the circular shear blades so as not to interfere with the shearing operation, whereas when electromagnets 67 are used, they may be carried by the stationary frame member 39' on opposite sides of the movable carriage 32'. Energization of the electromagnets 67 pulls the strip material downwardly against the circular shear blades 33'.

In FIGS. 11 through 13, there is shown a shearing apparatus 69 generally similar to that shown in FIGS. 1 through 3, including a vertically movable upper shear assembly 70 and a transversely movable lower shear assembly 71 which cooperate with each other to shear strip material therebetween during traversal of the strip material by the lower shear assembly. However, instead of using circular shear blades 33 on the lower shear assembly 71, there is provided one or more rectangular shear blades 72. Preferably, the rectangular shear blade 72 is of a relatively short length and received in an angularly disposed slot 73 on a holder 74 attached to the lower shear assembly carriage 75 by a mounting bracket 76.

Adjustment of the lateral clearance between the rectangular shear blade 77 of the upper shear assembly 70 and lower rectangular shear blade 72 may be achieved as by providing slotted holes 78 in the mounting bracket 76 for attachment of the mounting bracket to the carriage 75 with the use of fasteners 79. Provision may also be made for adjusting the rake angle of the lower rectangular shear blade 72, as by pivotally mounting the holder 74 to the mounting bracket 76 at 80 spaced from the shear blade 72 and providing a vertical slot 81 also spaced from the pivot 80 for receipt of a mounting bolt 82 which releasably clamps the holder in position relative to the mounting bracket. Should the lower rectangular shear blade 72 become damaged or dull during use, it may readily be replaced with a new one, since it is held in place by a single screw 83.

In FIG. 14 there is shown a modified form of shearing apparatus 85 generally similar to the shearing apparatus of FIGS. 11 through 13 except that two lower rectangular shear blades 72' are provided on the blade holder 74°, one at each end of the holder for shearing strip material during transverse movement of the carriage 75' in either direction. To facilitate adjustment of the rake angle of the rectangular shear blades 72', a central pivot 86 is desirably provided for the blade holder 74', with arcuate slots 87 on opposite sides of the pivot for receipt of mounting bolts 88 for adjustably clamping the holder in position.

From the foregoing, it will now be apparent that the various forms of shearing apparatus disclosed herein are of a relatively simple and inexpensive construction which nevertheless permit accurate shearing of strip and sheet material with very little or no bending of the material. The rake angle of the shear blades may be adjusted to suit or eliminated altogether as desired, and the shearing apparatus may be made to shear during movement of the transversely movable shear assembly in either or both directions.

We, therefore, particularly point out and distinctly claim as our invention:

1. A shear assembly comprising a carriage, a plurality of circular shear blades mounted on said carriage, means mounting said carriage for transverse movement relative to the material to be sheared, the cutting edges of said circular shear blades being in the same vertical transverse plane for shearing the material during such transverse movement of said carriage, and means for varying the rake angle of said circular shear blades, said means for varying the rake angle of said circular shear blades comprising a pivotal support on said carriage for said circular shear blades, and means for pivoting said support toward and away from the material to be sheared.

2. A shear assembly comprising a carriage, means mounting said carriage for transverse movement relative to the material to be sheared, sheared means mounted on said carriage for shearing the material during such transverse movement, and means for progressively advancing said shear means toward the material to be sheared for progressively shearing the material during transverse movement of the carriage in both directions.

3. The shear assembly of claim 2 wherein said means for progressively advancing said shear means as aforesaid comprises a vertically movable support on said carriage for said shear means, and a wedge block on said carriage axially movable relative to said support for effecting such vertical movement of said support.

4. The shear assembly of claim 3 further comprising a rotatable shaft on said carriage having threaded engagement with said wedge block, a stationary support spaced from one end of said carriage in line with the path of movement thereof, and a rotatable tubular member mounted for rotation on said stationary support, said shaft being slidably received in said tubular member and rotatable by rotation of said tubular member for moving said wedge block axially relative to said vertically movable support.

5. The shear assembly of claim 2 wherein said means mounting said carriage for transverse movement comprises an eccentrically mounted hub spaced from one end of said carriage in line with the path of movement thereof, a bearing supported on said hub, means for rotating said hub, and a link interconnecting one end of said carriage with the outer race of said bearing, whereby rotation of said hub causes reciprocation of said carriage.

6. A shear assembly comprising a carriage, a plurality of circular shear blades mounted on said carriage, means mounting said carriage for transverse movement relative to the material to be sheared, the cutting edges of said circular shear blades being in the same vertical transverse plane for shearing the material during such transverse movement of said carriage, and the sides of said circular shear blades being beveled, and means for retaining the material against vertical displacement away from the circular shear blades during such transverse movement, said means for retaining the material against such vertical displacement comprising electromagnet means for pulling the material to be sheared against the circular shear blades.

7. The shear assembly of claim 2 wherein said shear means comprises a plurality of circular shear blades mounted on said carriage, the cutting edges of said circular shear blades being in the same vertical transverse plane for shearing the material during such transverse movement of said carriage.

8. The shear assembly of claim 7 wherein all of said circular shear blades project to the same vertical extent to provide a zero rake angle.

9. The shear assembly of claim 7 wherein said circular shear blades project to different extents for progressive shearing of the material during transverse movement of said carriage.

10. The shear assembly of claim 2 wherein said shear means comprises a plurality of circular shear blades mounted on said carriage, the cutting edges of said circular shear blades being in the same vertical transverse plane for shearing the material during such transverse movement of said carriage, said circular shear blades progressively projecting further from both ends of said carriage to the center for progressive shearing of the material during transverse movement of said carriage in both directions.

11. A shear assembly comprising a carriage, a rectangular shear blade, a holder for said rectangular shear blade, said holder having a pivotal connection to said carriage spaced from said rectangular shear blade for pivotal movement of said holder to permit adjustment of the rake angle of said rectangular shear blade, and means mounting said carriage for transverse movement relative to the material to be sheared by said rectangular shear blade, said holder having an arcuate slot therein spaced from said pivot, and a mounting bolt extending through said arcuate slot for releasably clamping said holder against movement.

12. The shear assembly of claim 11 wherein said holder has a further slot for receipt of said rectangular shear blade, and a single fastener for releasably retaining said rectangular shear blade within said further slot, a mounting bracket for said holder, and means for adjusting the position of said mounting bracket on said carriage to adjust the position of said rectangular shear blade.

13. The shear assembly of claim 11 wherein there are rectangular shear blades mounted on opposite ends of said holder for shearing the material during transverse movement of the carriage in either direction, and said holder is pivotally connected to said carriage intermediate the ends thereof to permit adjustment of the rake angle of said rectangular shear blades by pivotal movement of said holder.

* * * * *